United States Patent
Meyer et al.

(10) Patent No.: US 8,526,771 B2
(45) Date of Patent: Sep. 3, 2013

(54) IN-PLANE OPTICAL WAVE GUIDE WITH AREA BASED SPLITTER

(75) Inventors: Neal Meyer, Corvallis, OR (US); Robert Newton Bicknell, Corvallis, OR (US); Pavel Kornilovich, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 239 days.

(21) Appl. No.: 13/061,459

(22) PCT Filed: Sep. 15, 2008

(86) PCT No.: PCT/US2008/076440
§ 371 (c)(1),
(2), (4) Date: Feb. 28, 2011

(87) PCT Pub. No.: WO2010/030295
PCT Pub. Date: Mar. 18, 2010

(65) Prior Publication Data
US 2011/0150390 A1    Jun. 23, 2011

(51) Int. Cl.
*G02B 6/26* (2006.01)

(52) U.S. Cl.
USPC .......... 385/31; 385/14; 385/15; 385/18; 385/27; 385/28; 385/29; 385/30

(58) Field of Classification Search
USPC .......... 385/14–15, 18, 27–29, 30–31
See application file for complete search history.

(56) References Cited

U.S. PATENT DOCUMENTS

| | | | |
|---|---|---|---|
| 5,039,988 A * | 8/1991 | Hong | 341/137 |
| 5,825,952 A * | 10/1998 | Kawanishi et al. | 385/47 |
| 5,917,596 A | 6/1999 | Jenkins | |
| 6,640,034 B1 * | 10/2003 | Charlton et al. | 385/122 |
| 6,775,427 B2 * | 8/2004 | Evans | 385/14 |
| 6,778,746 B2 * | 8/2004 | Charlton et al. | 385/122 |
| 7,031,575 B2 | 4/2006 | Blauvelt | |
| 7,206,470 B2 | 4/2007 | Li | |
| 7,277,611 B1 | 10/2007 | Glebov | |
| 2005/0111781 A1 | 5/2005 | Jain | |
| 2005/0207693 A1 | 9/2005 | Yokouchi | |
| 2006/0008199 A1 | 1/2006 | Glebov | |
| 2006/0062512 A1 | 3/2006 | Lee | |
| 2006/0126995 A1 | 6/2006 | Glebov | |
| 2006/0208165 A1 | 9/2006 | Lee | |
| 2007/0189666 A1 | 8/2007 | Kornilovich | |

* cited by examiner

*Primary Examiner* — Ryan Lepisto
*Assistant Examiner* — Guy Anderson

(57) ABSTRACT

An optical interconnect includes a set of splitters. Each splitter includes a source waveguide, a reflection waveguide, an output waveguide, and a partially reflective mirror element with a reflective coating. The source waveguide and the reflection waveguide are optically coupled to the partially reflective element. A photonic signal from the source waveguide is partially reflected off the reflective coating as a reflected signal into the reflection waveguide. The output waveguide is optically coupled to the opposite surface and configured such that a non-reflected portion of the photonic signal propagates into the output waveguide. The reflective coating includes a reflected surface area interfacing with the photonic signal form the source waveguide, and power of the non-reflected portion is a function of the reflective surface area interfacing with source waveguide.

15 Claims, 6 Drawing Sheets

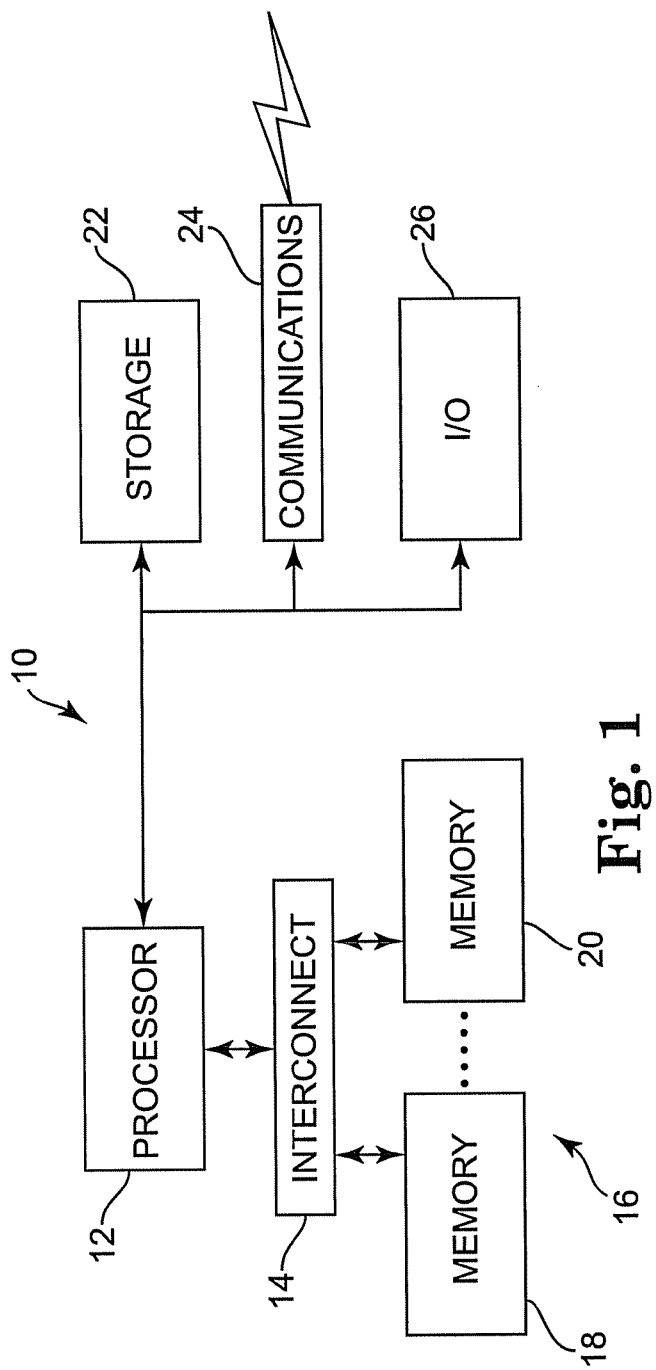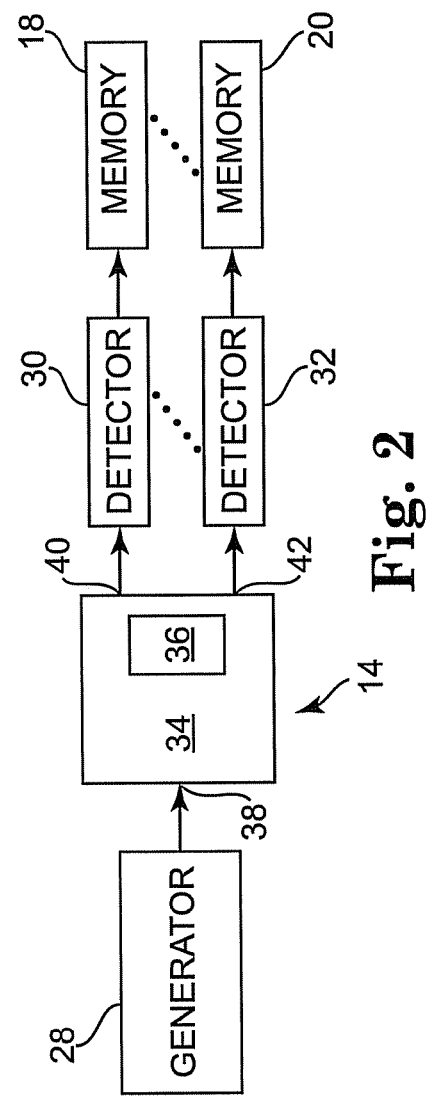

IN-PLANE OPTICAL WAVE GUIDE WITH AREA BASED SPLITTER

BACKGROUND

Optical solutions are being considered for many high performance computer interconnects because of superior data transmission rates over electrical interconnects. Interconnects are used in computer systems such as in coupling a processor to a volatile memory. Optical interconnects in computer systems provide for higher chip to chip interconnect speeds than current electrical interconnects. For example, electrical interconnects are predicted to have a physical limit of about 15 Gigabits per second chip to chip speed. As data transmission rates increase in electrical interconnects, signal attenuation becomes a limiting factor. Optical interconnects can support speeds of 20 Gigabits per second and beyond.

Complex and data intensive applications that make use of multiprocessor systems continue to require greater data through put and thus higher data transmission rates. Optical signal paths between the processors or the memory can be ideal in such a system. The use of optical interconnects in high-speed multiprocessor system that requires high-speed communication between the individual processors or the memory is preferred. Optical splitters are used in the interconnects to send signals from the processors to two or more memory modules or to other processors.

A limiting factor in the use of optical interconnects is the cost, which is related to the complexity of design and manufacture of optical waveguides in the interconnects. For example, current optical interconnects use three dimensional features to reflect and split light with complex bending mirrors or dielectric stacks. Substrates for the interconnects require complex manufacturing surfaces angled to the z-direction of the substrate. These complicated manufacturing techniques and parts in the interconnects also result in lower than ideal yields, which further increases costs

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a block diagram illustrating an example environment of the present disclosure.

FIG. 2 is a block diagram illustrating an example feature of FIG. 1.

DETAILED DESCRIPTION

Figure 3:
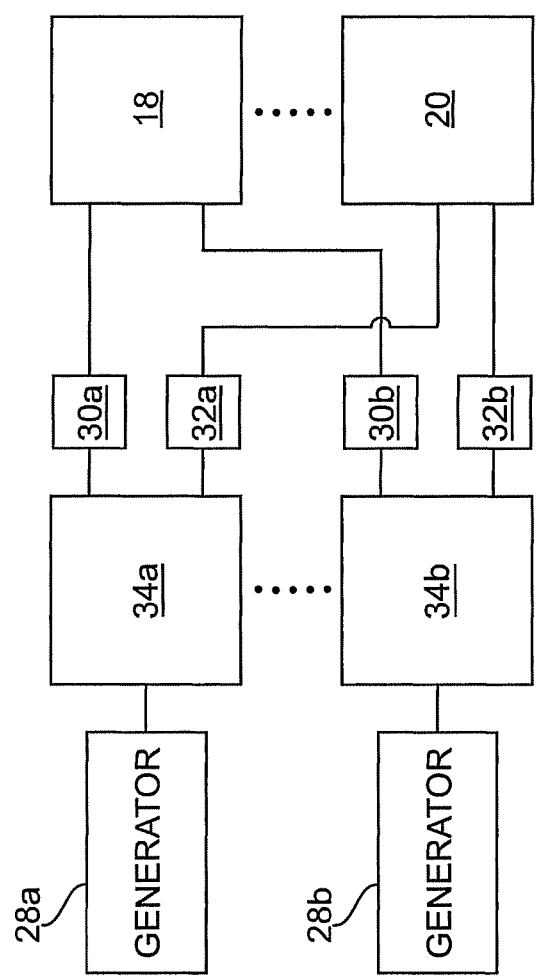
FIG. 3 is a block diagram illustrating another example of the feature of FIG. 2.

In the following Detailed Description, reference is made to the accompanying drawings, which form a part hereof, and in which is shown by way of illustration specific embodiments in which the invention may be practiced. In this regard, directional terminology may be used here with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that the features of the various exemplary embodiments described herein may be combined with each other, unless specifically noted otherwise FIG. 1 illustrates an example environment for the disclosure. The environment includes a computing system 10, such as a personal computer, a server, a handheld device, a video game console, or the like. The system 10 includes at least one processor 12, or multiple processors, which are often located on a motherboard (not shown). The processor 12 is coupled to an optical device 14. The optical device 14 is also connected to a volatile memory 16, which can include at least two memory modules 18, 20 such that each memory module is operably coupled to the processor 12 through the optical device 14. The system 10 can also include components such as one or more storage devices 22, a communications device 24 to allow the system to communicate with another device or over a network of at least one other computer, and various input and output components 26 such as one or more of keyboards, displays, printers, pointing devices, and the like.

The optical device 14 can assume one of a number of configurations. In one example, all or part of the optical device 14 can be integrated into a printed circuit board, such as the PCB used as the mother board. The optical device 14 can also be included on a single chip or on multiple chips or some of or the entire the optical device 14 can be located within the processor chip itself. In cases where some of or the entire optical device 14 is a separate chip or chips, the chips can also be located on the motherboard. In the example shown, the optical device 14 forms part of a memory bus configured to send and receive signals representative of data from the processor 12 to the memory 16 or from the memory 16 to the processor 12 during read and write operations. In one example, the memory modules 18 and 20 are each one or more Dual Inline Memory Modules (DIMM) that each receives the same data from the processor 12 during a write operation.

FIG. 2 illustrates an example optical device 14. The optical device includes a photonic generator 28, two or more photonic detectors or receivers 30, 32, and an in-plane waveguide 34 that includes at least one area based optical splitter 36. In the example, the generator 28 receives an electrical signal from the processor 12 and converts the signal into a photonic signal. The photonic signal is provided to an input port 38 of the waveguide 34. The photonic signal passes through the splitter 36 to create two signals from the optical signal. Each of the two signals is provided to one output port 40, 42. The output ports provide the signals to the optical receivers 30, 32, each of which is connected to a separate memory module 18, 20.

FIG. 3 illustrates another example of the optical device where two or more photonic generators 28a, 28b each provide a photonic signal to a corresponding waveguide 34a, 34b. The waveguides 34a, 34b each provide two or more outputs of the corresponding output signals to photonic receivers 30a, 32 a, 30b, 32b. Photonic receivers 30a and 30b provide the signals to the first memory module 18, and photonic receivers 32a and 32b provide the signals to the second memory module 20. In this case the photonic signals from the generators 28a and 28b can each represent one bit of data at a time. Each bit of data is transferred to each of the memory modules 18 and 20. One skilled in the art can now imagine how of system of more than two bits can be constructed with additional generators, waveguides, and receivers.

Additional examples are contemplated and are intended to fall within the scope of this disclosure whether known or unknown. In some cases, multiple generators can each provide the signals to one or more photonic multiplexers, which can be coupled to the input port 38 or other input ports. This way, fewer waveguides are used in the design or more bits can be carried on a single optical path. The signals are subsequently de-multiplexed prior to the photonic receivers 30, 32, in this example. In still an additional embodiment, the memory modules can be coupled to photonic generators and the processor can be coupled to photonic receivers so as to provide optical paths in a read operation. In still another example, a memory module 18 can be coupled to the photonic generator 28 of FIG. 2, and the photonic receivers can provide the signal from the memory module 18 to two or more processors 12 to each receive the same data such as for use in concurrent programming.

The photonic generators 28 in the examples receive data signals in the form of electrical signals and convert the electrical signals into a radiation signal, i.e., laser beams. In one example, the photonic generators are laser diodes. Each electrical signal is provided to a corresponding laser diode, and each laser diode generates a laser beam that is directly provided to the first optical input 38.

The laser diode is a semiconductor device that produces coherent radiation when current passes through the device. One example of a suitable laser diode is a vertical cavity surface emitting laser (VCSEL). The acronym VCSEL is pronounced "vixel." The VCSEL is particularly suited for fiber optic communication because it is less expensive, more efficient and provides for faster data speed than older laser diodes, such as edge-emitting diodes. The VCSELs also tolerate wide temperature ranges making them optimal for use in extreme conditions. The VCSEL includes an active region with an active layer that produces the laser beam. The active region is sandwiched between a pair of reflectors. A common reflector is a distributed Bragg reflector (DBR), which includes alternatively laminated high-refractive index layers and low-refractive index layers. The laser emits from the VCSEL often in the shape of a cone. Common VCSEL materials include gallium arsenide (GaAs), aluminum gallium arsenide (AlGaAs), and indium gallium arsenide nitride (InGaAsN), and VCSELs can be manufactured with known semiconductor manufacturing techniques.

The photonic detectors 30, 32 in the examples receive the optical signals and convert the photonic signals into a corresponding electrical signal. In the example shown, each optical signal from the output ports 40, 42 is provided to a corresponding photonic detector 30, 32, such as a photodiode, and each photodiode generates an electrical signal corresponding with the selected optical signal to the memory modules 18, 20.

The photodiode is a semiconductor device that generates a current in response to a received optical signal. Two suitable types of photodiodes include a positive intrinsic negative diode, commonly referred to in the art as a PIN diode and an avalanche photodiode (APD).

One general example of a PIN diode, for illustration, has a multi-layered structure formed by epitaxially growing on an n-InP substrate and n-InP buffer layer, an n-InGaAs photo-detecting layer and an n-InP window layer. A Zn diffusion region is provided in the center section of the n-InP window layer where this portion is changed from n-type to p-type. The Zn diffusion region extends to the n-InGaAs photo-detecting layer to form a p-n junction. A ring-like p-electrode in which a window is provided to allow the incidence of light is provided on the surface of the Zn diffusion region. The window can be coated with an antireflection-film coating. An n-electrode is also provided by the vacuum evaporation process on the opposite end surface of the InP substrate. Light enters through the antireflection-film coating into the interior of the element. The window layer consists of InP, band gaps of which are larger than those of InGaAs, and is rather thin. Accordingly, the amount of light absorbed at the window layer is relatively small. The PIN photodiode is particularly advantageous for its light sensitivity and value. The light incident surface and the active region photodiode are positioned adjacent to each other so that there is little chance that light is absorbed at an inactive region thus improving quantum efficiency and detection sensitivity.

An avalanche photodiode (APD) is a photodiode that internally amplifies a photocurrent with an avalanche process. A relatively large reverse-bias voltage is applied across the active region, which causes electrons initially generated by the incident photons to accelerate as they move through the APD active region. As the electrons collide with other electrons in the semiconductor material, they cause a fraction of them to become part of the photocurrent, which is known as avalanche multiplication. Avalanche multiplication continues to occur until the electrons move out of the active area. Typical semiconductor materials used in the construction of APDs include silicon (Si), indium gallium arsenide (InGaAs), and germanium (Ge). The response time of an APD and its output circuitry depends on the same factors as PIN diodes. The only additional factor affecting the response time of an APD is the additional time required to complete the process of avalanche multiplication.

In cases where multiple photonic signals are generated at the same time, such as one or more bytes in parallel, a photonic generator array of several photonic generators, i.e., generators 28a and 28b. A VCSEL array is a linear array of discrete VCSELs on an integrated circuit. Similarly, the phonic detectors 30, 32 can be arranged in into an array of photodiodes, where the photonic generator array and the array of photodiodes can be constructed with known semiconductor manufacturing techniques.

Figure 4:
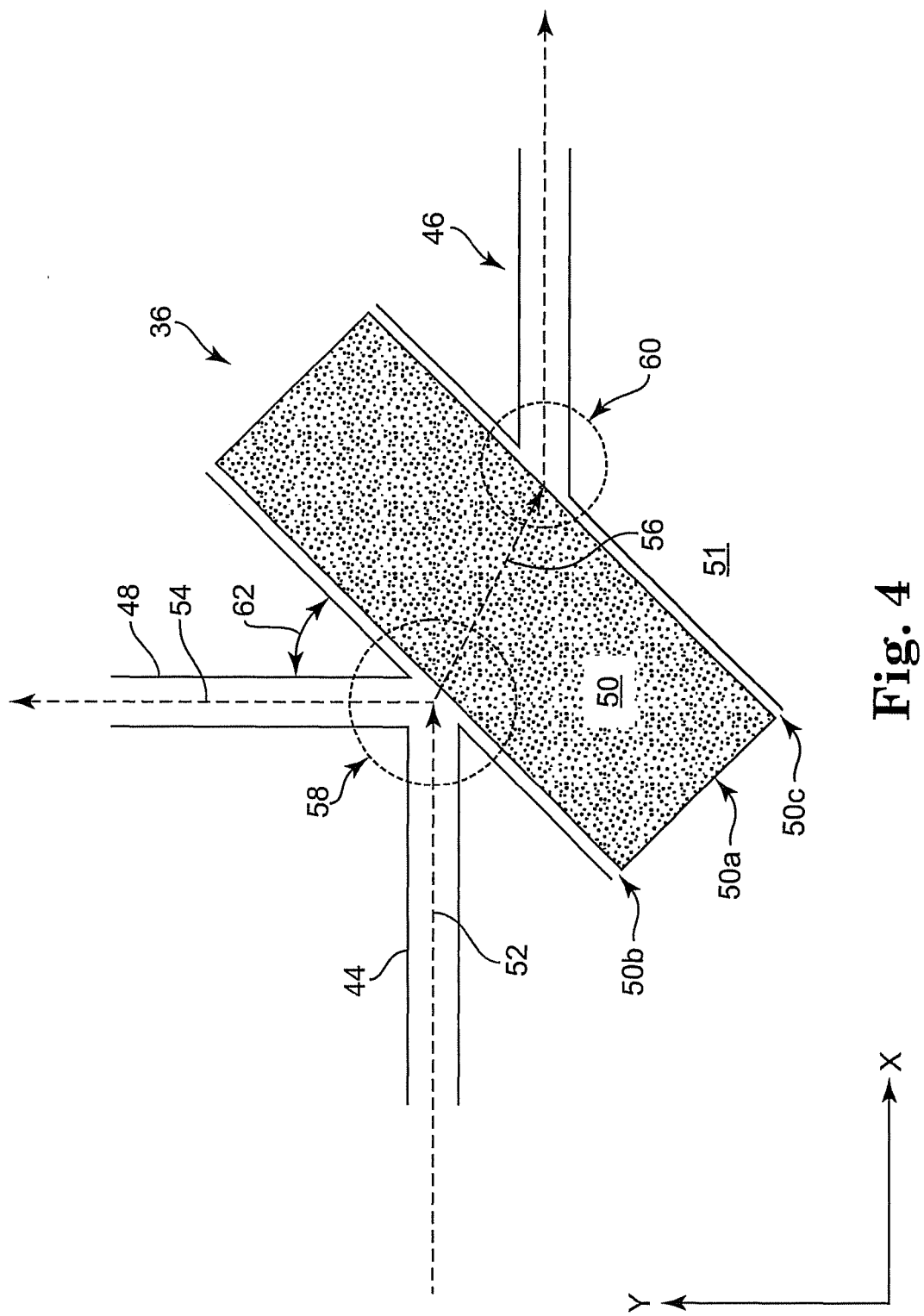
FIG. 4 is a schematic diagram illustrating an example feature of FIG. 2.

FIG. 4 illustrates an example optical splitter 36 included in the in-plane waveguide 34. Major components of the splitter 36 include source waveguide 44, an output waveguide 46, a reflection waveguide 48, and a partially-reflecting element, which in this example is a pellicle 50. As illustrated, the components are located in an x-y plane of a planar waveguide 34 and are manufactured into a planar substrate 51. The x-y plane can be parallel with the motherboard PCB or be included in all or part of the motherboard PCB. The waveguides 44, 46, and 48 are located in the x-y plane as is the pellicle 50. This provides for manufacturing advantages, and some of the advantages are described below.

In one example, the waveguides 44, 46, and 48 include waveguide trenches formed in a planar layer substrate (not shown). The waveguides in one example are etched or milled into the substrate. All of the major components can be etched or milled at the same depth. In one example, the etching or milling can be performed with any suitable substrative process capable of defining 150 micron features such as trenches having a width and depth of 150 microns. Methods used to fabricate out of plane waveguides and splitters of the prior art have required more complex or addition steps of deep etching or sawing to enable insertion of discrete splitters or mirrors. The in-plane construction of the device is planar, and thus manufacturing the device can be fabricated in a single imprinting or embossing step. The trenches can be coated with aluminum (Al), silver (Ag), or other suitable material to promote transmission of the photonic signals.

A trench can be formed for the pellicle 50 at the same depth as for the waveguides 44, 46, 48. The pellicle 50 is wide enough to be handled easily in manufacturing and then can be cut to the proper length. The pellicle 50 can include a glass plate 50a having a partially-reflecting coating on surface 50b. By partially reflecting in this example, it is meant a portion of the light incident on the coating will be specularly reflected off of the surface 50b, and another portion of the light will pass through the coating and into the glass plate 50a. In some examples, the coating can include silver (Ag). In some examples, the glass plate 50a can include an anti-reflective coating on the opposite surface, i.e. surface 50c as shown in the figure. Other examples of partially-reflecting pellicles 50 are contemplated.

The use of hollow metal waveguides with pellicles provides several additional advantages, among which a few more are listed here. The hollow metal waveguide provides for smaller numerical apertures than polymer or dielectric waveguides. This reduces waveguide crossing losses and provides for manufacturing multiply connected structures in the same plane.

FIG. 4 also illustrates a path of a photonic signal 52 through the splitter 36. The photonic signal 52 enters the splitter 36 either from the input port 38, a preceding splitter, or some other source and is transmitted along the source waveguide 44. The photonic signal 52 is incident on the partially-reflecting surface 50b of pellicle 50 such that a reflected portion 54 of the photonic signal 52 is specularly reflected into the reflection waveguide 48. The pass-through portion 56 of the photonic signal is diffracted in the pellicle 50, and exits the pellicle 50 at surface 50c into the output waveguide 46. The output waveguide 46 can be coupled to an output port 40 or 42, to another splitter, or to another destination. The reflection waveguide 48 can be coupled to an output port 42 or 40 in many designs, or to another splitter or other destination. In some instances, the output port 42 or 40 can be located out of the plane and toward the z direction, which can include the use of a 45 degree vertical mirror proximate the output port.

Depending on the amount of diffraction or "walk-off" of the pass through portion of the optical signal 56 in the pellicle 50, the output waveguide 46 may need to be offset from the path of the original photonic signal 52 in the source waveguide 44. The amount of diffraction in the pellicle 50 is related to its material and thickness. A pellicle 50 with a relatively large thickness reduces or eliminates etalon and ghosting artifacts of the reflected and diffracted signals off of opposing surfaces of the pellicle. If the material of the pellicle is kept the same, a thicker pellicle also results more diffraction, which requires a greater offset between the source waveguide 44 and the output waveguide 46.

The splitter 36 also includes areas 58 and 60 where the waveguides 44, 46, and 48 interface with the pellicle 50. The geometry of the output waveguide 46 relative to the pellicle can be optimized to capture the diffracted signal 56. Similarly, the geometry of the source and reflection waveguides 44, 48 relative to the pellicle at area 58 can be optimized to decrease back reflection into the source waveguide 44. In the example shown, angle 62 between the reflection waveguide 48 and the pellicle surface 50b is about 45 degrees. Accordingly, the angle of incidence of the original photonic signal 52 on the partially-reflective surface 50b is also 45 degrees.

Figure 5:
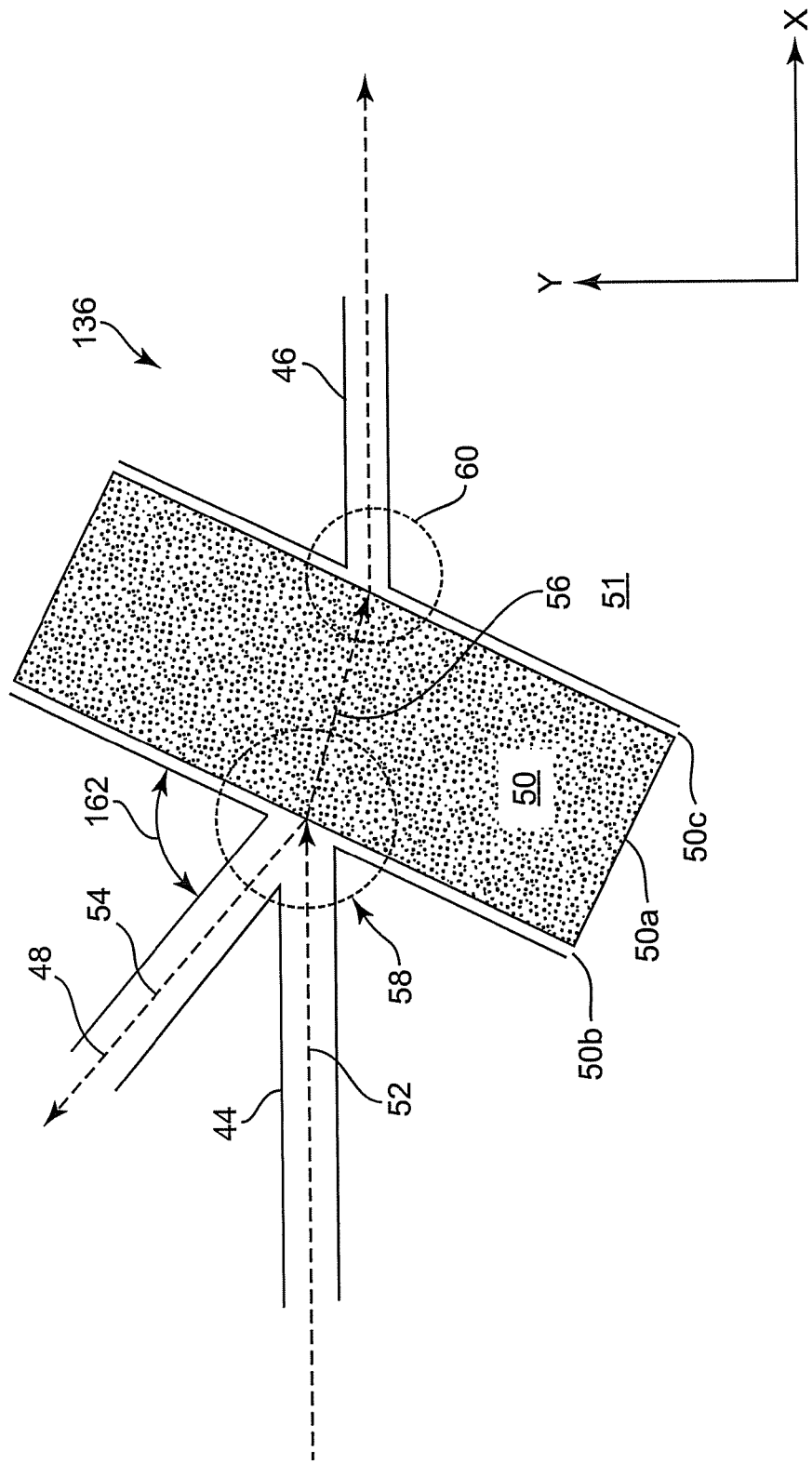
FIG. 5 is a schematic diagram illustrating another example of the feature of FIG. 4.

FIG. 5 illustrates an example optical splitter 136 that can also be included in the in-plane waveguide 34 where like parts of optical splitter 36 include like reference numerals. Angle 162 between the reflection waveguide 48 and the pellicle surface 50b is much greater than 45 degrees, which is the angle 62 of optical splitter 36. Accordingly, the angle of incidence of the original photonic signal 52 on the partially-reflective surface 50b is much less than 45 degrees. Further, the lower incidence angle of splitter 136 provides for less walk-off than in splitter 36, and thus less offset with output waveguide 46.

The lower incidence angle of splitter 136 provides for less area of the pellicle 50 interfacing with the source waveguide 44 than in splitter 36. The result of the less pellicle area interfacing with the source waveguide 44 is that more power of the original optical signal 52 is reflected into the reflection wave guide as the reflected portion than in splitter 36. Also, less power of the original optical signal 52 is passed-through the pellicle into the output waveguide 46 in the diffracted signal 56 than in splitter 36. If the partial reflectivity of the pellicle 50 is held constant, the reflectivity of surface 50b increases with the incidence angle of the original optical signal 52 and surface 50b. Thus, pellicles can be manufactured with a constant reflectivity to pass-through ratio or split ratio, and a wave guide designer can adjust reflectivity by varying the angle of incidence. Manufacturing steps can be reduces if all pellicles included the same split ratio, such as 20-80, rather than having to manufacture pellicles of different split ratios depending on the location of their implementation into the waveguide.

Figure 6:
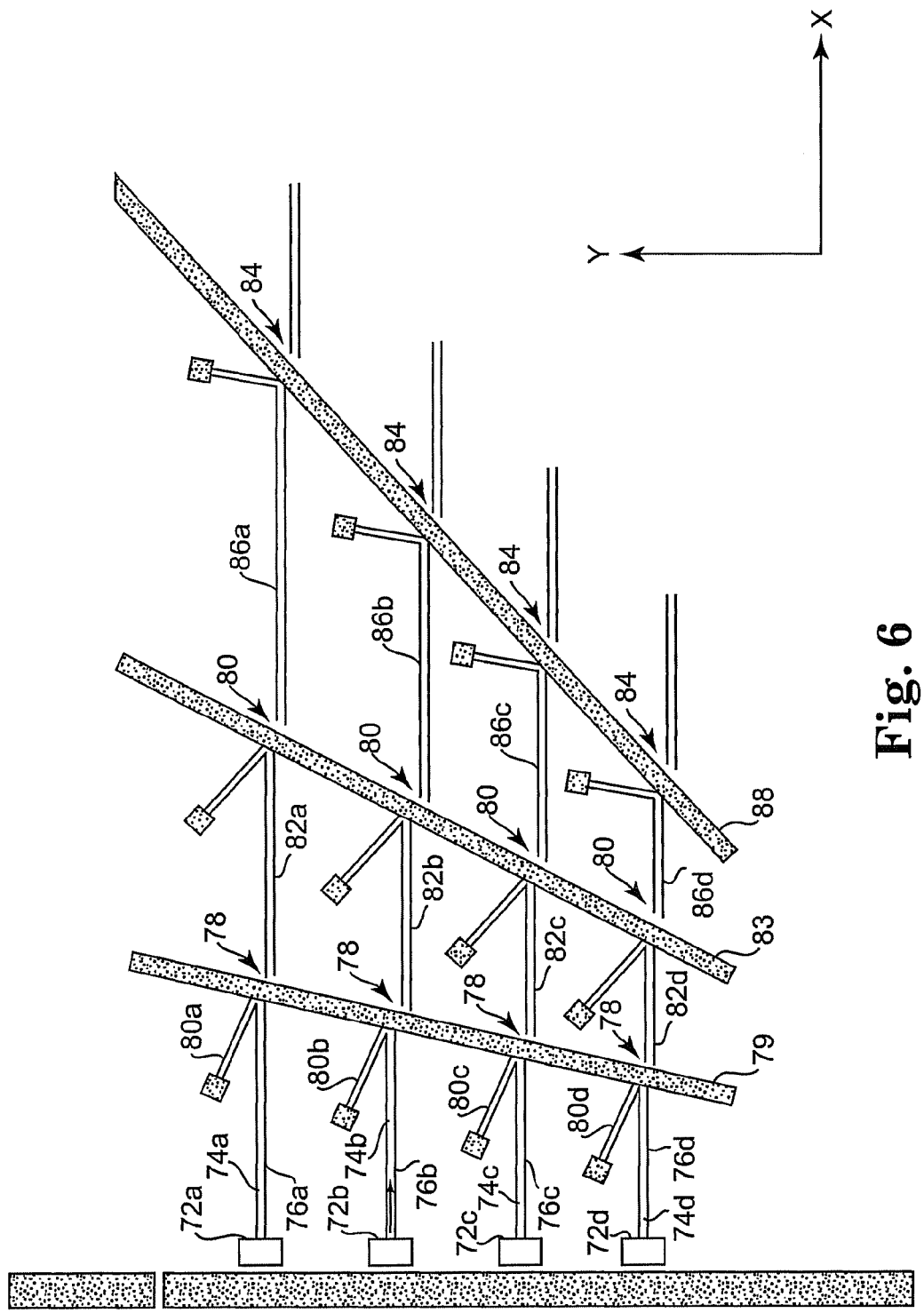
FIG. 6 is a schematic diagram illustrating an example of a system including features of FIGS. 4 and 5.

FIG. 6 illustrates an example waveguide 70 including four optical signal sources. Because of the in-plane nature of the components and flexibility of in-plane design, complex optical networks can be created with one type of splitter. In this straightforward example, each signal will pass through three splitters, where each splitter includes a different incidence angle of the waveguide axis to the pellicle. The combination of three splitters in series produces four output beams of each optical signal. These output beams can be routed to four memory modules, and each memory module will receive the same data from each of the four signal sources. This is described in more detail below.

The signal sources 72a, 72b, 72c, 72d generate corresponding optical signals 74a, 74b, 74c, 74d that are transmitted through corresponding parallel first waveguides 76a, 76b, 76c, 76d to a first splitter 78 including a first pellicle 79. A single pellicle 79 at a selected angle in the x-y plane to provide the incidence angle is used in all of the first splitters 78. The angle is selected based on the amount of power to be reflected into corresponding first reflective waveguides 80a, 80b, 80c, 80d. In the case where the optical signal will pass through more splitters down stream, the amount of desired reflectivity is often relatively low, and the incidence angle of the first splitters 78 is also relatively low, as illustrated. The first reflectivity waveguides 80a, 80b, 80c, 80d in the example are terminated with out of plane mirrors set at 45 degree angles to direct the reflected signals towards the z direction where the signals can be routed to their respective destination, such as a first memory module.

Downstream splitters and waveguides operate in a similar function to first splitter 78. The refracted portions of the optical signals pass-through the first splitter 78 and propagate toward second splitters 80 via second waveguides 82a, 82b, 82c, 82d. The angle of the pellicle 83 is selected to provide an incidence angle having a larger incidence angle than in the first splitter 78. This provides more power in the reflected signals of the second splitters 80. Further, the refracted portion of the optical signals pass through the second splitter and propagate toward third splitters 84 via third waveguides 86a, 86b, 86c, 86d. The angle of the pellicle 88 is selected to provide an incidence angle having a larger incidence angle than the second splitter 80. The refracted portions of the optical signal can be terminated at output ports, or they can continue to additional splitters. Each successive splitter can include a greater incidence angle than the one prior to provide increasing split ratios in each successive splitter.

Power in the reflected signal is increased from splitter to splitter as the photonic signals propagate through the waveguides. In the example shown, three successive splitters 78, 80, 84 are used to separate each of the sources 72a, 72b, 72c, 72d to form four outputs for each source. These four outputs can be provided as a bit to four memory modules or four additional processors. In order for the signal to have an appropriate signal strength at each of the four outputs, the power of each output can be made to be relatively the same by varying the incidence angle in each successive splitter. For example, to provide a first output (reflectivity signal) in splitter 78, the beam is split at a ratio of the inverse of the number of outputs remaining Accordingly, the incidence angle is selected to provide a reflected wave power output of 1/n of the total signal source strength. In the present example, the n is four, so the power in the reflected wave is ¼ the original power. The refracted portion after the first splitter 78 will be split into three remaining outputs, so the power of the reflected signal in the second splitter is ⅓ the power of the signal in the second waveguides 82a, 82b, 82c, 82d. The refracted portion of the signal after the second splitter 80 will be split into two remaining outputs, so the power of the reflected signal in the second splitter 80 is ½ the power of the signal in the third waveguides 86a, 86b, 86c, 86d.

Depending on the number of splitters in an optical path, the incidence angle of the waveguides to the pellicles can be adjusted to provide an appropriate power output. Where n is the number of output signals desired from a source of an optical signal, the power output of the reflected signals progress through n−1 splitters. The first splitter provides a reflected signal power of 1/n, the remaining splitter in succession are 1/(n−1), 1/(n−2) . . . ½. The splitters can be fabricated monolithically with the waveguides and eliminate insertion of discrete splitters into the wave guides.

Figure 7:
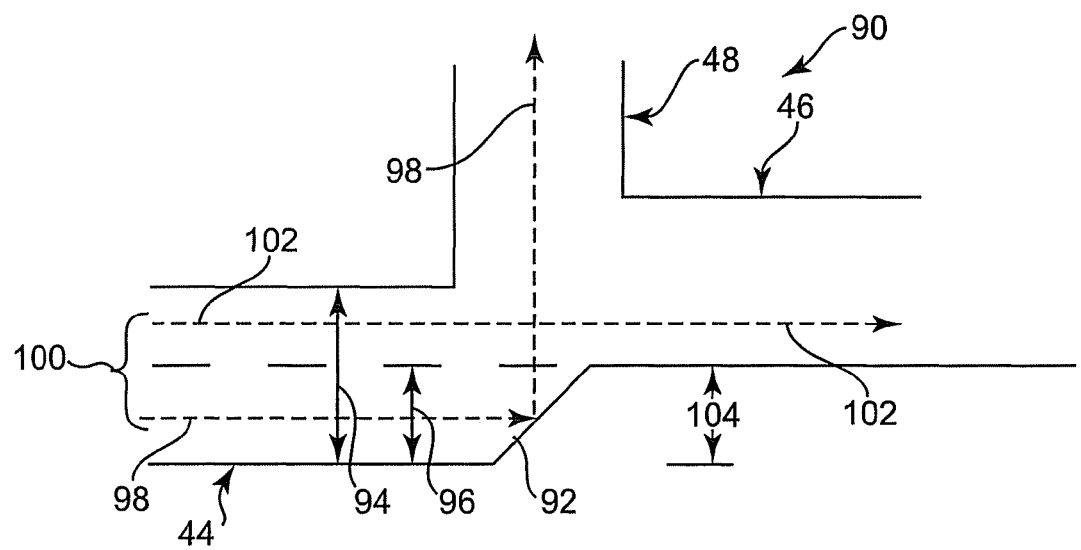
FIG. 7 is a schematic diagram illustrating another example feature of FIG. 2.

FIG. 7 illustrates another example splitter 90 that can be used instead of the splitter 36 in the in-plane waveguide 34. Major components of the splitter 90 also include the source waveguide 44, the output waveguide 46, a reflection waveguide, and a partially reflecting element, which in this example is a specularly reflecting mirror 92. In this example, the source wave guide 44 includes a cross sectional area, of which a dimension is indicated at 94. The mirror 92 also includes a cross sectional area aligned with the source waveguide that is equal to or smaller than the cross sectional area of the source waveguide 44. A dimension of the cross sectional are of the mirror 92 is indicated as an effective reflecting portion at 96. At least a portion 98 of the photonic signal 100 is incident on the mirror and reflected into the reflection waveguide 48. In the case where the cross sectional area of the wave guide 94 is larger than the cross sectional area of the mirror 96, some of the photonic signal 100, such as portion 102, will not reflect off the mirror 92. Instead, the output wave guide is configured to receive the non-reflected portion 102.

The amount of power of a photonic signal 100 reflected or pass through the splitter 90 is related to the ratio of the cross sectional areas of the mirror 92 to the source waveguide 44. A larger cross sectional area of the mirror will result in more power of the optical signal 98 being reflected into the reflection waveguide 48 and less power of the optical signal 102 passing through to the output wave guide 46, and vice versa. In the example, the mirror 92 is formed to be a 45 degree angle to the axis of the source waveguide 44, and thus the axis of the reflection waveguide 48 is at a right angle to the axis of the source waveguide 44. Of course other combinations are possible and are dependent on designer choice. Also in this example, the trenches used to create the waveguides 44, 46, 48 are of the same width and depth for manufacturing efficiency.

Figure 8:
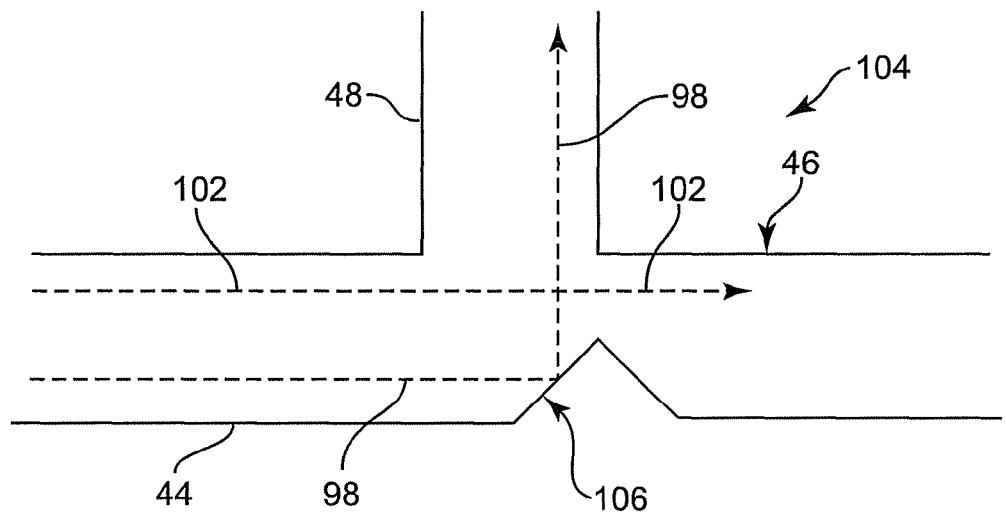
FIG. 8 is a schematic diagram illustrating another example of the feature of FIG. 7.

FIG. 8 illustrates another example of a splitter, i.e. splitter 104, having a mirror 106 included in the path of the source waveguide 44 where like parts have like reference numerals. In the example of splitter 104, the source waveguide 44 and the output waveguide 46 are aligned with each other. The mirror 106 is placed inside the waveguide 44, 46 to reflect the light incident on the mirror into reflection waveguide 48.

One skilled in the art can now appreciate that the reflection waveguide need not extend in the same x-y plane as the source or the output waveguides 44, 46. In one example, a mirror can be configured to reflect a portion of the photonic signal into the z-direction and another portion of the photonic signal will pass in the x-y plane. The reflection waveguide can extend in the z-direction. Other configurations are possible.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical interconnect, comprising:
   a plurality of splitters, wherein each splitter includes a plurality of in-plane optical waveguides including a source waveguide, a reflection waveguide, and an output waveguide;
   a single partially-reflective mirror element disposed in-plane within each of the plurality of splitters and common to each of the plurality of splitters, the partially-reflective mirror element having a reflective surface and an opposite surface;
   wherein the source waveguide and the reflection waveguide of each of the plurality of splitters are optically coupled to the partially reflective surface such that for each of the plurality of splitters a photonic signal from the source waveguide is partially reflected off the reflective coating as a reflected signal into the reflection waveguide;
   wherein the output waveguide of each of the plurality of splitters is optically coupled to the opposite surface such that for each of the plurality of splitters a non-reflected portion of the photonic signal propagates into the output waveguide; and wherein the reflective surface includes a reflecting surface area interfacing with the photonic signal from each of the source waveguides, and power of the non-reflected portion is a function of the reflecting surface area interfacing with source waveguide.

2. The optical interconnect of claim 1 wherein an amount of reflectivity of the reflective surface is generally the same in each of the plurality of the splitters.

3. The optical interconnect of claim 2 wherein the amount of reflectivity of the reflective surface does not permit the photonic signal from the source waveguide to pass through the reflective surface.

4. An optical interconnect comprising:
a plurality of in-plane splitters, wherein each of the plurality of splitters includes a plurality of generally co-planar waveguides including a source waveguide, a reflection waveguide, and an output waveguide;
a single pellicle disposed in the plane of the waveguides and common to each of the splitters, the pellicle having a partially-reflective surface and an opposite surface;
wherein the source waveguide and the reflection waveguide of each of the plurality of splitters are optically coupled to the partially reflective surface such that for each of the plurality of splitters a photonic signal from the source waveguide is partially reflected as a reflected signal into the reflection waveguide; and
wherein the output waveguide of each of the plurality of splitters is optically coupled to the opposite surface and configured such that a non-reflected portion of the photonic signal is diffracted into the output waveguide.

5. The optical interconnect of claim 4 wherein an axis of the source waveguide is generally parallel to an axis of the output waveguide.

6. The optical interconnect of claim 4 wherein the axis of the output waveguide is offset from the axis of the source waveguide.

7. The optical interconnect of claim 6 wherein a thicker pellicle results in a greater offset.

8. The optical interconnect of claim 4 wherein the waveguides are formed of waveguide trenches on a substrate.

9. The optical interconnect of claim 8 wherein the walls of the substrate in the waveguide trenches include a coating of aluminum.

10. The optical interconnect of claim 8 wherein the waveguide trenches have generally an equal depth, and wherein the pellicles are dispose in pellicle trenches in the substrate wherein the pellicle trenches also generally include the same depth as the trenches.

11. The optical interconnect of claim 4 wherein the photonic signal is specularly reflected partially at an incidence angle with the partially reflecting surface wherein an increase in the incidence angle results in an increase in power of the reflected signal.

12. The optical interconnect of claim 11 wherein an increase in the incidence angle results in an increase of a surface area of the partially reflective surface interfacing with the source waveguide.

13. The optical interconnect of claim 4 wherein the output waveguide is configured to be optically coupled to another pellicle.

14. An optical interconnect comprising:
a plurality of in-plane splitters, wherein each of the of the plurality of splitters includes a plurality of generally co-planar waveguides including a source waveguide, a reflection waveguide, and an output waveguide, wherein the source waveguide includes a reflective portion and a pass-through portion;
a single mirror common to each of the plurality of splitters and disposed within the reflective portion of the each of the source waveguides, the mirror having a reflective surface;
wherein for each of the plurality of splitters, the source waveguide and the reflection waveguide are optically coupled to the reflective surface of the single mirror and configured such that a photonic signal from the source waveguide in the reflective portion is reflected into the reflection waveguide; and
wherein for each of the plurality of splitters, the output waveguide is optically coupled to the source waveguide and configured such that the non-reflected portion of the photonic signal propagates into the output waveguide.

15. The optical interconnect of claim 14 wherein the source waveguide includes a source cross sectional area, the mirror includes an effective cross sectional area less than the source cross sectional, and the effective cross sectional area corresponds with the reflective portion.

* * * * *

UNITED STATES PATENT AND TRADEMARK OFFICE
CERTIFICATE OF CORRECTION

Page 1 of 1

PATENT NO. : 8,526,771 B2
APPLICATION NO. : 13/061459
DATED : September 3, 2013
INVENTOR(S) : Neal Meyer et al.

It is certified that error appears in the above-identified patent and that said Letters Patent is hereby corrected as shown below:

In the Claims

In column 10, line 20, in Claim 14, delete "of the of the" and insert -- of the --, therefor.

Signed and Sealed this
Thirty-first Day of December, 2013

Margaret A. Focarino
*Commissioner for Patents of the United States Patent and Trademark Office*